July 6, 1926.

J. S. TRITTON

PISTON

Filed Jan. 2, 1926

1,591,800

Inventor
J. S. TRITTON.
per: Sydney E. Page.
Attorney.

Patented July 6, 1926.

1,591,800

UNITED STATES PATENT OFFICE.

JULIAN SEYMOUR TRITTON, OF SURBITON HILL, ENGLAND, ASSIGNOR TO FREDERICK SEYMOUR TRITTON, OF SURBITON HILL, ENGLAND.

PISTON.

Application filed January 2, 1926, Serial No. 79,024, and in Great Britain May 7, 1925.

This invention relates to improvements in pistons, plungers, or the like, reciprocating in a cylinder. It is particularly applicable to pistons for use in internal combustion engines, and hereinafter will be described in reference to such, though it should be understood that the invention is not limited to the same.

The primary object of the invention is to construct a very light piston which shall have wearing qualities equivalent to those of the heavier steel or cast iron piston which has largely been used in the past; and a second object is to construct a piston which will work in a light weight cylinder, say, of aluminium alloy, or of other light weight metal, or alloy, or any metal having good heat conducting properties.

In internal combustion engines, or indeed in any reciprocating engines, there are well known advantages attached to a light piston, and for some time past pistons of aluminium alloy, or aluminium have been in use. The difficulty, however, has been that such light weight pistons are subject to rather rapid wear when working in a cast iron cylinder, and are unsatisfactory when used in a metal cylinder of light alloy or other relatively soft metal, as it is found in practice that bearing surfaces composed of such soft material, say, of aluminium alloy, do not wear well together.

To overcome this objection a bearing band of harder material has been provided in practice, around the centre of the piston in order to obtain better wearing qualities, such a band having usually been proposed with clearance between it and the bottom of the piston body recess which it occupies, or it has been a tight fit therein with outward spring to it.

Figure 1:
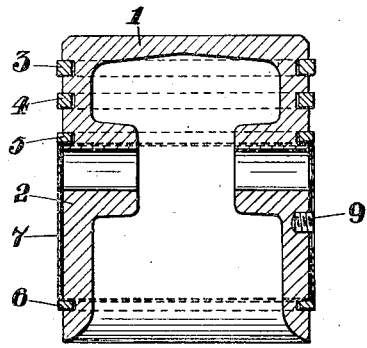
Figure 2:
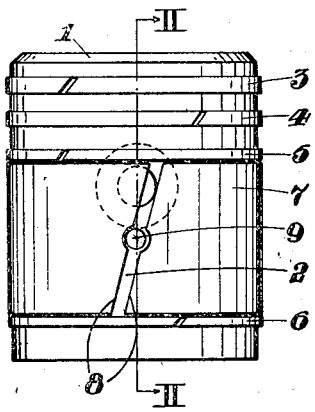
Figure 4:
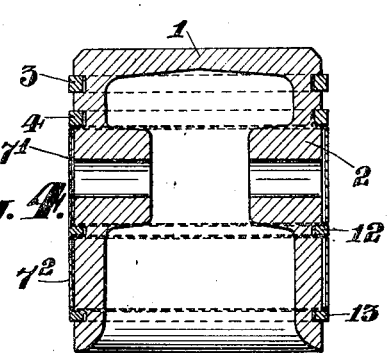
Figure 3:
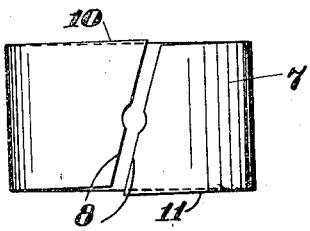
Figure 5:
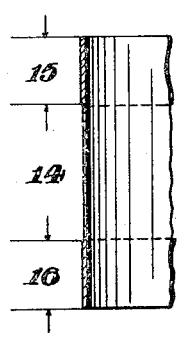

Referring to the accompanying drawings and to various views and reference signs appearing therein, Fig. 1 is a sectional view of the piston on the line II—II of Fig. 2; Fig. 2 is a side elevation of Fig. 1; Fig. 3 is a detail view showing a bearing ring made as a slight spiral; Fig. 4 is a sectional view showing a divided bearing ring utilizing one of the ordinary piston rings as a wall of the recess at one end; and Fig. 5 is an enlarged sectional view of the bearing ring having its central zone ground away.

The present invention relates to a piston provided with a skirt upon which a bearing band is fitted and which consists in a simple and effective construction and arrangement whereby increased wearing results are secured, and which will now be described more in detail.

Referring to Figs. 1 and 2, 1 is the crown of the piston, 2 its side wall, and 3, 4 are ordinary spring or joint-making rings of hard material; the body composed of the walls 1, 2 is intended to be constructed of aluminium alloy or other light metal, grooves for the ordinary joint rings 3, 4 being made at the rear end of the body; while additional packing rings 5, 6 of hard material are provided on the piston body, of which 6 adjoins the front edge of the piston skirt, the bearing ring 7 of steel about 1/32 inch thick (for a small piston) being disposed between the packing rings 5 and 6 and being divided, as shown at 8 in Fig. 2, while closely fitting the body of the piston 2.

Outward spring may be imparted to the rings 5 and 6, but the bearing ring 7, being very thin, may be applied with slight grip on the piston body 2, so that as the piston becomes heated during operation in its cylinder, the expansion of the body 2 being in greater degree than that of the ring 7 will tend to support the latter tightly around it as the piston reaches its working temperature.

As there will be some considerable friction on the bearing ring 7 owing to the obliquity of the connecting rod, there will be a tendency to end thrust on the rings 5 and 6 by the edges of the bearing ring 7, but being of hard material as compared with the aluminium body, bad wear due to such thrust is prevented.

Referring to Fig. 3, since in the case of a wide steel ring 7 and an aluminium body 2 the expansion of the latter will be greater than that of the ring 7, it may with advantage be formed of a slightly spiral character, as shown, so that there is always a definite bearing of the edges 10, 11 against the limit rings 5 and 6, which will prevent hammering of the ring against the latter which might occur if a large clearance endways were allowed.

To prevent rotation of the bearing ring 7 so that the division 8 remains in position where it will not strike ports of a cylinder, for example, a pin as shown at 9 may with advantage be placed in the side wall 2, protruding sufficiently far to stop movement of the ring 7 on its support.

Fig. 4 shows a modification in which the bearing ring 7 is divided into parts $7^1$ and $7^2$, the first section $7^1$ being confined by the ordinary joint ring 4 and the packing ring 12, while the second section $7^2$ is confined by the packing rings 12, 13; with the expansion of the bearing ring divided between the two parts $7^1$ and $7^2$, deleterious clearance between their edges and the limit rings 4, 12, 13 does not occur, due to the difference in the material of the piston body 2 and that of the rings $7^1$, $7^2$.

It will be obvious that the wide ring 7 might occupy the recess between the packing rings 4 and 13, as shown in Fig. 4, instead of between the special rings 5 and 6, as shown in Fig. 1.

Fig. 5 illustrates an enlarged section of a bearing ring in which the central zone 14 on its upper surface is ground away, say, from 2/1000 inch to 5/1000 inch, or thereabouts, in order that the bearing surface may be reduced. In this case, the bearing will come on the end sections 15, 16. Such other portions of the bearing sleeve that are not required to bear on the cylinder walls may be ground away in a like fashion.

Since substantially the whole of the contact between the piston and its cylinder will be taken by the bearing ring and the joint rings, there will be but little of the piston periphery apart from its contact surface, and it will be clear that in the case of a very thin ring as is contemplated in this invention, it is not really necessary to have a recess in the piston body especially to receive the ring. Consequently, in the case of a piston, say, like Fig. 1, instead of a recess made in the piston body, beneath the bearing ring 7, the piston body may be turned throughout of an even diameter and the bearing ring 7 may be put on the outside thereof, being kept in position as before by the packing rings 5 and 6. The bearing ring 7 should fit the body with a slight grip thereon, as before, whereby the skirt becomes substantially a solid fitting when expanded under working conditions.

With this invention applied to the construction of a piston, the advantages of the light body 2, combined with the bearing ring 7, are such as to enable a piston to be used in internal combustion engines with the great advantage of the whole being of very light character, and which will enable an aluminium piston to be used with an aluminium cylinder.

I claim:—

1. In a piston, the combination with a body portion of light metal or alloy, of a skirt on the said body having a deep groove at either end thereof, packing rings of hard material occupying the said grooves, and a thin bearing ring of hard material without outward spring disposed on the body between the said packing rings, whereby end thrust of the said bearing ring during working is taken by the said packing rings.

2. In a piston, the combination with a body portion of light metal or alloy, of a skirt on the said body having a shallow annular recess terminating in a deep groove at either end thereof, a bearing ring of hard material without outward spring occupying the said recess, and packing rings of hard material occupying the said grooves, whereby end thrust of the said bearing ring during working is taken by the said packing rings.

3. In a piston, the combination with a body portion of a light metal or alloy, of a skirt on the said body having deep grooves at either end thereof, packing rings of hard material occupying the said grooves, a thin bearing ring of hard material without outward spring disposed on the body between the said packing rings, the said bearing ring being formed as a slight spiral adapted to give an end pressure on the said packing rings, and having a central zone a little below the bearing surfaces at its ends.

4. In a piston, the combination with a body portion of light metal or alloy, of one or more normal packing rings thereon, a skirt on the said body having a deep groove at its forward end, a packing ring of hard material in the forward groove of the said skirt, and a bearing ring of hard material around the skirt extending from the special skirt packing ring and the normal packing ring.

5. In a piston, the combination with a body portion of light metal or alloy, of one or more normal packing rings thereon, a skirt on the said body having a deep groove at its forward end and having a shallow annular recess extending from the said groove to the groove of the forward normal packing ring, a packing ring of hard material in the forward groove of the said skirt, and a bearing ring of hard material extending from the special skirt packing ring and the normal packing ring and occupying the said recess.

6. In a piston, the combination with a body portion of light metal or alloy, of a skirt on the said body, two or more deep grooves at the ends of the said skirt, a groove or grooves intermediate of the end grooves, packing rings of hard material occupying the said grooves, and bearing rings of thin, hard material disposed between the said packing rings.

7. In a piston, the combination with a body portion of light metal or alloy, of a skirt on the said body, two or more deep grooves at the ends of the said skirt, a groove or grooves intermediate of the end grooves, packing rings of hard material occupying the said grooves, and bearing rings of hard material, each formed as a slight spiral, disposed between the said packing rings.

8. In a piston for working in a cylinder of light metal or alloy, an aluminium body portion, a skirt on the said body having one or more shallow annular recesses terminating in a deep groove at either end of said recesses, and a bearing ring of steel closely fitted in the said recess or recesses, and packing rings of hard material occupying the said grooves, whereby the relative expansion of the piston body, the steel bearing ring or rings, and the cylinder in which the piston works provides a hard metal bearing surface for the skirt of the piston without appreciable clearance between it and the cylinder under the heat of working conditions.

In testimony whereof I affix my signature.

JULIAN SEYMOUR TRITTON.